No. 640,497. Patented Jan. 2, 1900.
R. H. STAPLES.
COCK AND FAUCET AND MEANS FOR DIMINISHING WASTE THEREFROM.
(Application filed May 11, 1899.)
(No Model.)
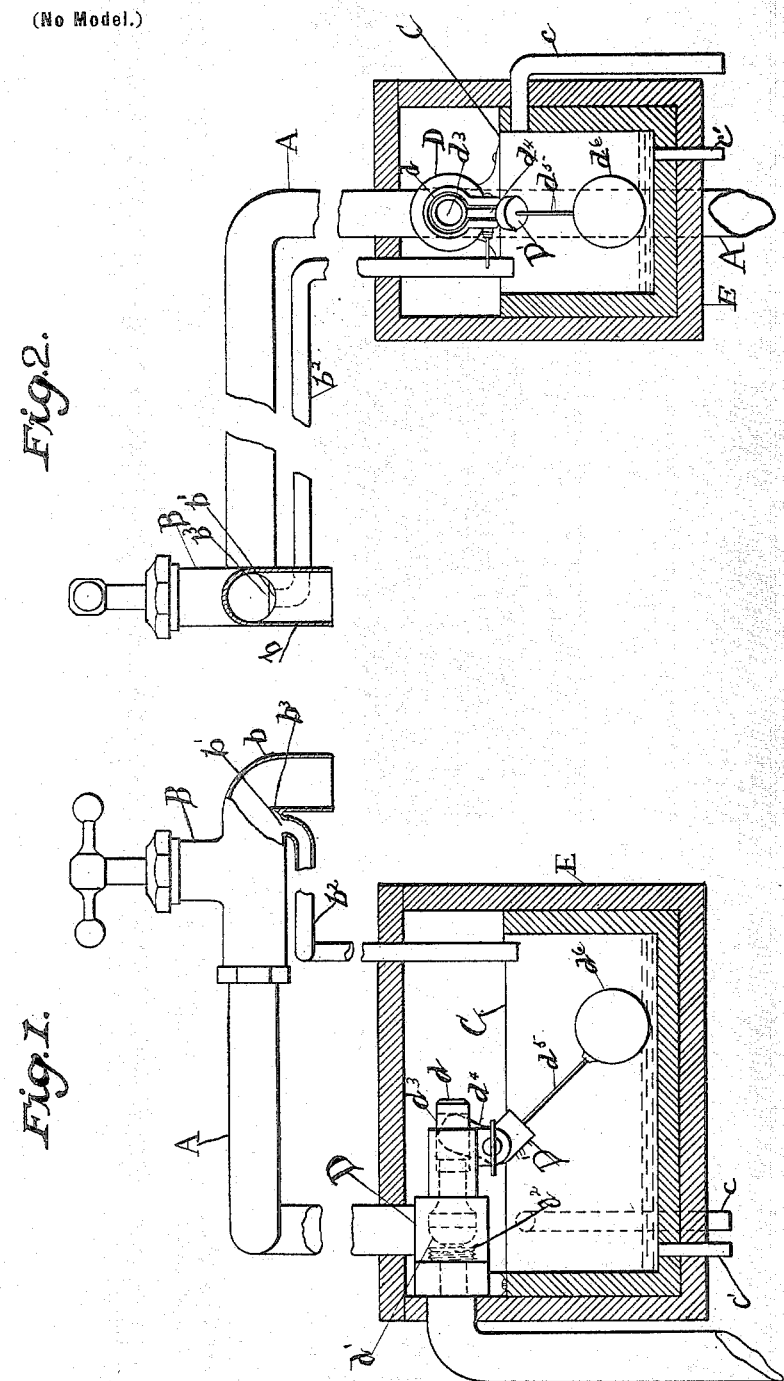

UNITED STATES PATENT OFFICE.

ROBERT H. STAPLES, OF LOWELL, MASSACHUSETTS.

COCK AND FAUCET AND MEANS FOR DIMINISHING WASTE THEREFROM.

SPECIFICATION forming part of Letters Patent No. 640,497, dated January 2, 1900.

Application filed May 11, 1899. Serial No. 716,457. (No model.)

*To all whom it may concern:*

Be it known that I, ROBERT H. STAPLES, a citizen of the United States, residing at Lowell, in the county of Middlesex and Commonwealth of Massachusetts, have invented a certain new and useful Improvement in Cocks and Faucets and Means of Diminishing Waste Therefrom, of which the following is a specification.

My invention relates to cocks and faucets and means of diminishing waste therefrom; and it consists in the devices and combinations hereinafter described and claimed.

Owners of tenement-houses are subjected to very large outlays for water allowed to run to waste by leaving faucets open. Tenants frequently leave faucets open through carelessness and sometimes maliciously. The water is sometimes allowed to run all night in winter to prevent freezing of the pipe, because the tenant is too lazy to shut off the water at the stop and waste cock usually provided for that purpose and located in the cellar.

The object of this invention is to shut off the water from the faucet when a certain amount has been drawn therefrom by means hereinafter described.

This invention permits a certain part of the water to run to waste, but prevents a much greater waste.

In carrying out my invention I provide the faucet with an auxiliary or supplementary discharge passage or outlet which leads from the nozzle of the faucet into a suitable receptacle, within which are arranged means operated by the waste water in said receptacle for shutting a valve in the pipe which supplies said faucet, such means consisting, preferably, of a ball-valve of ordinary construction, the float of which rests upon the surface of the water or other liquid in said receptacle and rising as the level of said water is raised by the water from said auxiliary discharge-passage closes the shut-off valve. Whenever the faucet is open, a part of the water from the supply-pipe goes through said auxiliary passage.

The waste-water receptacle or tank is provided with a waste passage or outlet through which the water slowly drips until the liquid level descends with the float far enough to allow the shut-off to be again opened by the weight of the float. In this manner when the faucet is left open for a long period the shut-off will be closed the greater part of the time, the intervals between the opening and closing of the shut-off depending upon the relative capacities of said auxiliary passage, receptacle, or tank, and waste-pipe, these capacities being made to depend upon the circumstances under which the combined device is to be used. I also provide the nozzle or outlet of the faucet with a pocket out of which the auxiliary discharge-passage leads, so that when the faucet is partly opened or leaks the device will be operated to shut off the water and to call the attention of the tenant and in one case to induce greater caution on the part of the tenant and in the other case to cause the tenant to notify the landlord of the need of repacking or other repairing of the faucet.

In the accompanying drawings, Figure 1 is a side elevation of the supply-pipe, faucet, with auxiliary discharge-passage, the waste-pipe, the overflow-pipe, the float and its lever, a vertical longitudinal section of the receptacle or tank and its case, and a central vertical longitudinal section of a part of the nozzle and auxiliary passage of the faucet; Fig. 2, a front elevation of the parts shown in side elevation in Fig. 1, a central vertical cross-section of the nozzle, and a vertical transverse section of the tank and its case.

The supply-pipe A is of usual construction, and a faucet B is secured to the delivery end thereof in the usual manner. The faucet B is of any ordinary construction except that its nozzle $b$ is provided with a pocket $b'$ or equivalent construction to retain a part of the liquid from the supply-pipe A and to cause said part to enter an auxiliary discharge-passage $b^2$, with which said faucet is provided and which leads from said pocket. The pocket $b'$ may be a depression in the inner surface of the nozzle $b$ or may be the space back of the transverse dam or retainer $b^3$. The object of the pocket $b'$ is to cause some part of the water which passes through the faucet to enter the passage $b^2$ when the faucet leaks or is only partly open, because when said faucet is wide open the pressure of the water therein will cause a part of said water to enter said passage $b^2$.

The passage or tube $b^2$ discharges into a suitable receptacle or tank C, causing the liquid-level to rise therein; but said tank is prevented from running over by an overflow-pipe $c$, which leads out of said tank in the usual manner. The tank is also provided with a waste-pipe $c'$, which leads out of the bottom thereof and has a much smaller capacity than the discharge-passage $b^2$, so that if the faucet is opened long enough the liquid level of the tank will rise to the top of the overflow-pipe $c$.

The supply-pipe A is provided with any usual valve adapted to let on or shut off water from the faucet. I have shown a valve D (shown partly in dotted lines in Fig. 1) of well-known form, the same consisting of a sliding bar $d$, having a conical head $d'$, adapted to fit a conical seat or opening $d^2$, said bar having a slot $d^3$, which receives the end of one arm $d^4$ of a bent lever D', the other arm $d^5$ carrying at its outer end a hollow ball $d^6$, which floats on the water in the tank C, rising and falling therewith, to force the head $d'$ toward or away from its seat $d^2$, and thus shutting off the water from the faucet when the water-level rises high enough and letting on the water when enough of the water has leaked out of the waste-pipe $c'$.

The tank C, the valve D and its operating mechanism, the upper end of the overflow-pipe $c$ and waste-pipe $c'$, and the lower end of the auxiliary discharge-passage $b^2$ are all preferably arranged within the case E, which prevents the tenant from moving or altering any of these parts.

I claim as my invention—

1. A cock or faucet provided with a single inlet, with a nozzle or outlet and with an auxiliary discharge-passage leading out of said nozzle and supplied by said nozzle.

2. A cock or faucet, provided with a single inlet, with a nozzle or outlet, having a pocket, and with an auxiliary discharge-passage leading out of said pocket and supplied by said nozzle.

3. The combination of a supply-pipe, a cock or faucet attached thereto, and provided with a nozzle or outlet and with an auxiliary discharge-passage leading out of said nozzle, a suitable receptacle into which said auxiliary passage discharges, and means for preventing the overflow of said receptacle.

4. The combination of a supply-pipe, a cock or faucet attached thereto, and provided with a nozzle and with an auxiliary discharge-passage leading out of said nozzle, a suitable receptacle into which said auxiliary passage discharges, a shut-off, arranged in said supply-pipe and means operated by the rising of the liquid in said tank to close said shut-off.

5. The combination of a supply-pipe, a cock or faucet attached thereto, and provided with a discharge-nozzle and with an auxiliary discharge-passage leading out of said nozzle, a suitable receptacle into which said auxiliary passage discharges, a valve in said supply-pipe, a lever, to operate said valve, and a float, carried by said lever and sustained by the liquid in said receptacle.

In witness whereof I have signed this specification, in the presence of two attesting witnesses, this 5th day of May, A. D. 1899.

ROBERT H. STAPLES.

Witnesses:
ALBERT M. MOORE,
GRACE E. HIBBERT.